United States Patent [19]

Gilby

[11] Patent Number: 4,717,240

[45] Date of Patent: Jan. 5, 1988

[54] INTERFEROMETERIC BEAMSPLITTER

[75] Inventor: Anthony C. Gilby, Foxboro, Mass.

[73] Assignee: The Foxboro Company, Foxboro, Mass.

[21] Appl. No.: 888,556

[22] Filed: Jul. 21, 1986

[51] Int. Cl.⁴ .................. G01B 9/02; G01B 11/02
[52] U.S. Cl. .................. 350/163; 350/96.14; 350/173; 350/286; 356/356
[58] Field of Search .............. 350/96.12, 96.13, 96.14, 350/163, 173, 286; 356/356, 357, 358; 73/704

[56] References Cited
U.S. PATENT DOCUMENTS

| 4,009,940 | 3/1977 | Ohzu | 350/163 |
| 4,329,775 | 5/1982 | Olsen et al. | 73/704 |
| 4,355,900 | 10/1982 | Nussmeier | 356/358 |
| 4,647,206 | 3/1987 | Kunzmann et al. | 356/357 |

Primary Examiner—Bruce Y. Arnold
Assistant Examiner—Martin Lerner
Attorney, Agent, or Firm—Terrence Martin; Jack H. Wu; William E. Meyer

[57] ABSTRACT

Beamsplitter means for directing light in a Michelson interferometric drive and frequency sense scheme for use with a mechanical resonator. In a first embodiment a special prism is used. In a second embodiment a four-port coupler is used.

8 Claims, 16 Drawing Figures $$I_t = \frac{I_0}{2}\left(1 + \cos\left(\frac{4\pi x}{\text{lambda}}\right)\right)$$

and  $I_r = I_0 - I_t$     EQUATION I $$\left(\frac{dI_t}{dx}\right)_{MAX} = \pm\frac{2\pi}{\text{lambda}}\cdot I_0$$

EQUATION II

WHERE: $X = \mp 1/8 \text{ lambda}$

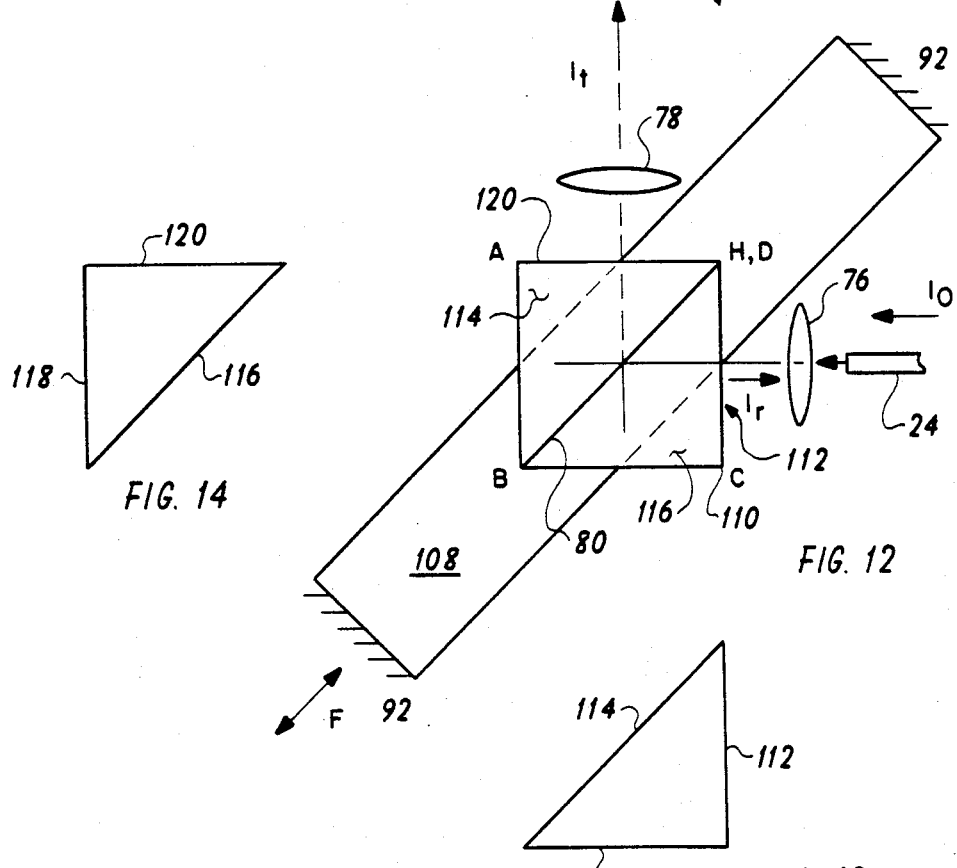

INTERFEROMETERIC BEAMSPLITTER

FIELD OF THE INVENTION

This invention relates to the field of fiber optic based communications and more particularly to apparatus and methods for dividing and combining optical power on an optical fiber at a measurement site. More particularly, a single optical fiber carries optical power to a remote site where the optical beam is split, the split beams interacting with a target resonant element. After recombining the interferometrically modulated output beams are used to drive the resonator and communicate the resonator frequency to a location where it may be used. The beamsplitter of the present invention enables the necessary optical beam splitting and recombining functions.

BACKGROUND OF THE INVENTION

As the advantages of fiber optic based communication and control of industrial processes becomes better known, increasing emphasis is being placed on various methods of simple, inexpensive, and reliable communication of low level radiant energy via fiber optics to the sensor site for making a desired measurement, and returning the measurement information on fiber optic paths to the control and measurement location. Among the many problems facing designers of such process control systems are the need for few, low light level optical paths and methods of accurately and reliably carrying out the measurements in such a way that the derived measurement information may be accurately communicated by means of fiber optic signals. In the application of resonant element sensors, it is especially important that low power, highly efficient sensors be developed to modulate the light available. One problem is in achieving high opto-mechanical loop gain in order to reduce the optical energy threshold to reasonable levels.

Instruments are well known wherein the resonant frequency of a resonant element subjected to a force is a function of the tension (or compression) applied to that resonator. It has been recognized that a force measuring instrument can be based on this relationship by causing the resonator to vibrate while a tension or compression force is applied thereto and measuring the vibration frequency. An application of this principle for vibrating wire resonators is known from U.S. Pat. No. 4,329,775. The present invention solves a problem presented in efficiently converting optical power to both drive and sense light beam signals for use with resonant elements, not limited to vibration wire resonators.

For the purpose of this limited description, "resonant mechanical structure", "resonator", and "resonant element" generally refer to beam (hollow beam, cantilevered beam and cantilevered hollow beam, and double- or other multiple-beam elements), and ribbon, wire or other articles of manufacture, and their equivalents, all of which can be resonated at particular oscillation frequencies. Specifically includes are tuning fork structures of the single- and double-ended varieties, as well as multiple tine tuning fork structures.

"Fiber optic", "optical fiber", and "radiant energy" path or pathway means and equivalent terms refer to single or multiple communication paths.

As used herein, the term "radiant power", light, optical power or light flux includes electromagnetic power of wavelengths between 0.1 and 100 micrometers, and specifically includes infrared, ultraviolet, and visible light. Here, light flux refers to the number of photons that pass through a plane per unit of time, and is measured in watts. For simplicity, such radiant energy may be referred to generally and without limitation as "light" or "optical" power. Such radiant power may also be described as "steady" or "continuous" or "unmodulated" in order to distinguish it from radiant power signals which are modified to carry information. The term "radiant power" specifically includes coherent and incoherent light power.

"Modulation" is used broadly herein, and it is intended to means modifying (or the modification of) some characteristic or characteristics of a light beam so that it varies in step with the instantaneous value of another signal, and specifically may be used herein to describe amplitude modulation and frequency modulation. "Unmodulated optical power" refers to optical power which is unmodulated in this sense.

"Monochromatic" refers to radiant power composed of a single wavelength. "Collimated light" refers to radiant power having rays which are rendered substantially parallel to a certain line or direction.

"Fluid" includes gases and/or liquids. The term "force" is used to describe any physical parameter or phenomenon capable of moving a body or modifying its motion, and specifically includes force exerted per unit area (pressure) and any parameter or phenomenon capable of conversion to pressure.

"Photothermal effect" and "photokinetic effect", as used herein, refer to the phenomenon wherein photons striking a suitable surface or surface coating cause localized heating, such heating being sufficient to cause localized expansion of the coating or substrate, and thus producing motion.

SUMMARY OF THE INVENTION

The present invention relates to beamsplitter means for use with a sensor at a sensor site in which the beamsplitter divides light from a source into separate beams for interferometric modulation by the resonant element. The modulated optical power is used to energize the resonator and to communicate the resonator frequency to a location where it may be used.

The present disclosure includes two specific embodiments: the first preferred embodiment makes use of a prism beamsplitter of a particular configuration. In a second preferred embodiment, an optical fiber beamsplitter is used to achieve the sensitive light handling needed for the sensor. Variations of these embodiments are also described herein.

BRIEF DESCRIPTION OF THE DRAWINGS

Numerous features of the invention disclosed herein will be apparent upon examination of the several drawing figures forming a part hereof. Solid line arrows may be used to indicate steady or light direction of travel herein, while dotted line arrows may be used to indicate pulsating or modulated light direction. In all views, like reference characters indicate corresponding parts:

FIGS. 12 through 15 show the prism beamsplitter form of the invention; and

DESCRIPTION OF THE PREFERRED EMBODIMENT

Figure 1:
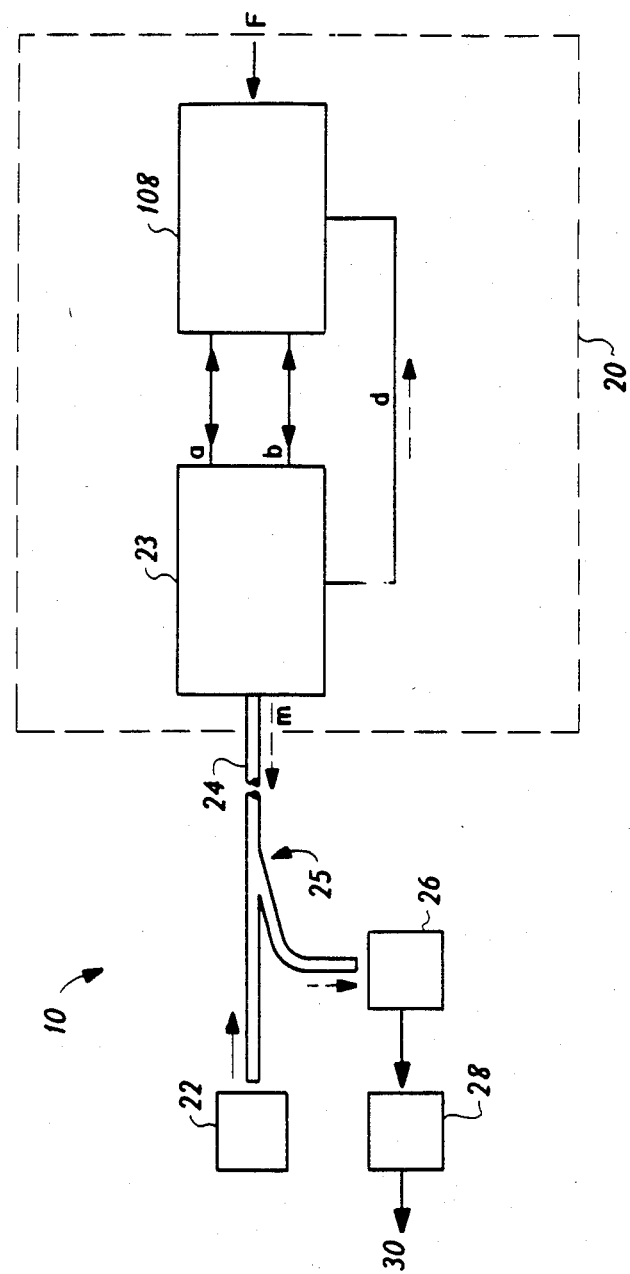
FIG. 1 is a simplified block diagram of the invention.

In the block diagram FIG. 1, a generalized block diagram of the self-oscillating resonant sensor system 10 is illustrated, showing an optically-powered resonant sensor 20, a light source 22, a conventional beam splitter 25, an optical fiber 24 pathway, a special beamsplitter means 23, detection means 26, output means 28 for producing an output signal 30, and resonator 108. Light beams a and b represent the split interferometer beams which interact with the resonator. Beam d represents the drive light path to the resonator, while light beam m represents modulated light being returned for detection.

Figure 2:
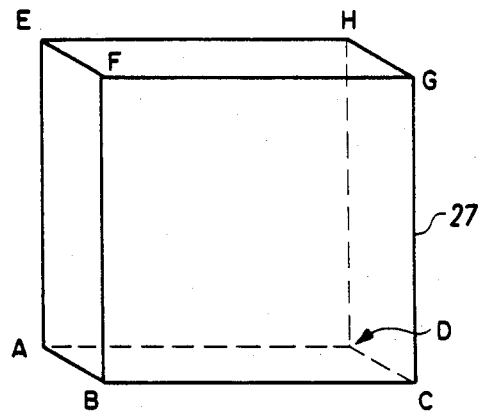
FIGS. 2 through 5 show a prism form of the invention and its manufacture.
Figure 3:
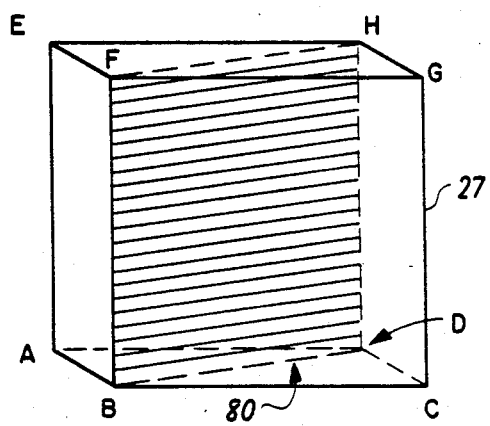
Figure 4:
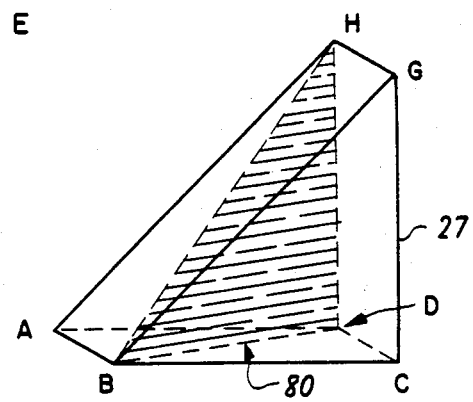
Figure 5:
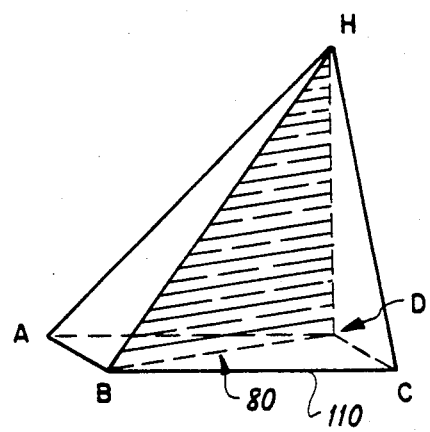

The prism beam splitter of the present invention is prepared from a cube 27 ABCDEFGH (see FIG. 2) of fused silica or the equivalent, and having a half-mirror 80 in the BDHF plane (see FIG. 3) thereof. For best operation the half mirror should divide the light equally between transmission and reflection without preference for polarization. In a first cut (FIG. 4) material is removed along the ABGH plane. Then in a second cut material is removed along the BCHE plane (E is now an imaginary location in space), leaving a pyramid (see FIG. 5) having a square base ABCD and apex H wehrein edge DH is perpendicular to the ABCD plane. A "wall" or "skirt" (not shown) may be left at the bottom of the base to aid in mounting and manufacture of the prism.

Figure 6:
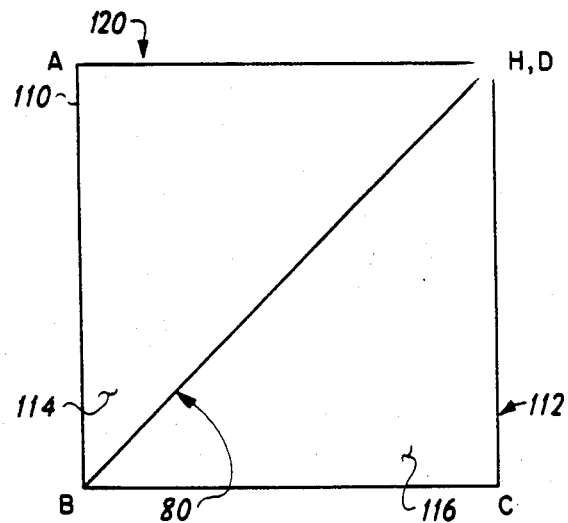
FIG. 6 is a plan view of the prism showing its major elements.

FIG. 6, a plan view of the prism, shows prism 110 entrance face 112, first 45-degree prism roof face 114, second 45-degree prism roof face 116, and prism exit face 120. The prism bottom surface 118 is not visible. The half mirror beamsplitter 80 is seen edge-on as a line through BD and H.

In the preferred embodiments of the present invention, special beamsplitter means and Michelson interferometry principles will be discussed as they may be used to achieve the sensitive light modulation and low power drive needed for an optical self-oscillating resonant element.

Figure 7:
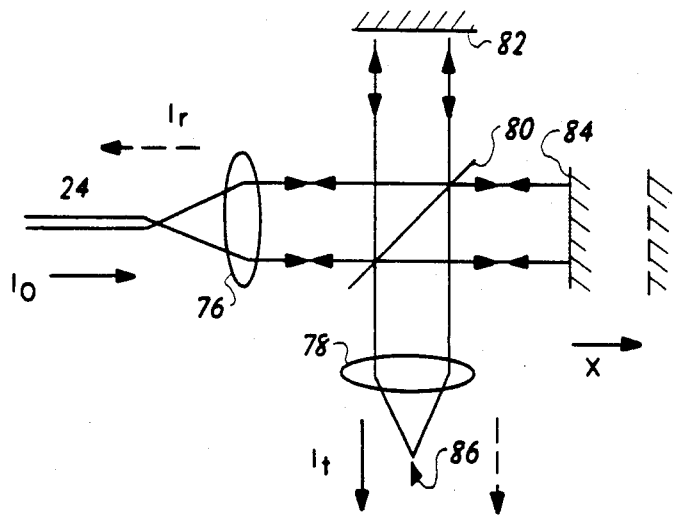
FIG. 7 illustrates the Michelson interferometric principles applied with the invention.

There is shown in FIG. 7 fiber 24, first collimator lens 76, first output lens 78, prism beamsplitter 80, first (or fixed) mirror 82, second (or target) mirror 84, and transmitted light flux 86.

FIG. 7 shows a simplified conventional Michelson interferometer. Unmodulated optical power from a source (not shown) is supplied via an optical fiber 24 and collimated by lens 76. This input light beam, here shown as ($I_0$) is split by beamsplitter 80 which may conveniently be a conventional cube beamsplitter. Light flux ($I_0$) is divided into two portions without polarization preference for the purposes of this embodiment. Mirrors 82 and 84 return light energy to the beamsplitter. Two output beams result. One beam is collected by lens 78 which exits at 86 as transmitted beam ($I_t$). The other beam ($I_r$) is returned via optical fiber pathway 24. Assume (for the present explanatory purposes only) that the first mirror 82 is fixed and the second mirror, 84, is a moving or vibrating surface having reflective characteristics. For the present purpose, this may be viewed as a portion of a resonant element.

Figure 8:
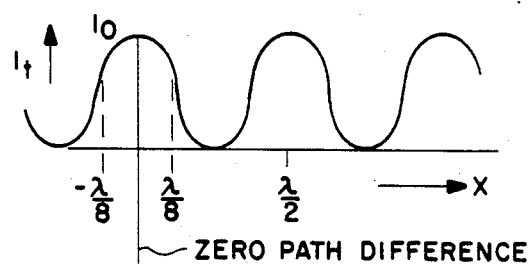
FIG. 8 show the relationship of the output light intensity with respect to motion of the moving mirror 84.

The transmitted light flux ($I_t$) is modulated as shown in FIG. 8 for the case of monochromatic light which is parallel through the interferometer. Mirror and beamsplitter losses may be ignored for the present illustrative purposes. In the case where the beamsplitter divides the light equally with no polarization preference, the variation of $I_t$ with motion of second mirror 84 is given by Equation I (see FIG. 9). When the two arms of the interferometer are equal, constructive interference results and it is maximum. When mirror 84 moves a distance of one-quarter wavelength in either direction interference is destructive and it is minimum. In the ideal case, modulation of the output beam is from $I_0$ to zero and the reflected light power ($I_r$) and the transmitted light ($I_t$) are complementary.

The conventional simple Michelson interferometer configuration shown in FIGS. 7 and 8 however, is not ideally suited for use in combination with a resonant element as a moving mirror. The system can be advantageously modified for use in combination with resonant elements, as in the present invention.

Figures 9, 10, 11:
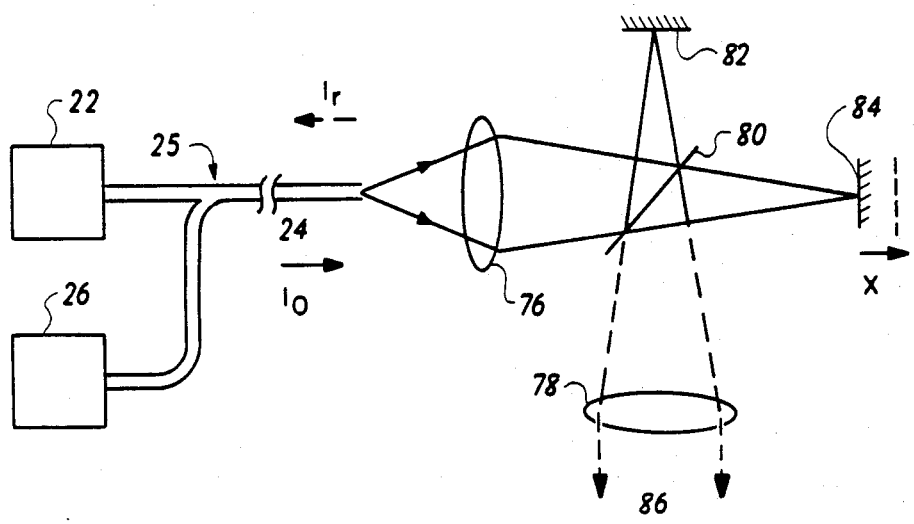
FIG. 9 is Equation I, showing the modulation of light by an ideal Michelson interferometer.
FIG. 10 illustrates improvements to a simle Michelson interferometer useful with the invention.
FIG. 11 is Equation II, which gives a expression for light modulation from a Michelson interferometer.

There is shown in FIG. 10 light source 22, optical fiber 24, beamsplitter means 25, and detection means 26, as well as first collimator lens 76, first output lens 78, beamsplitter 80, first fixed mirror 82, and target mirror 84.

In the improvement shown in FIG. 10, lenses 76 and 78 are readjusted so as to focus the light beam through the interferometer to a focus on the two mirrors 82, 84. The small beam focus at mirror 84 is then compatible with the small area reflective surface of a micro-sized resonant element. That is, the mirror 84 is located on the surface of the resonator. The contrast and depth of modulation of the light intereference as mirror 84 moves decreases as the path length of the interferometer arms becomes unequal. However, if the interferometer is operated with close to equal path length in the two arms the degree of modulation of light power ($I_t$), 86 in FIG. 10, is essentially as large as in the conventional parallel beam interferometer, FIG. 7. The change of transmitted light power as mirror 84 makes small changes in position is maximized as shown in Equation II, FIG. 11. The focussed beam Michelson interferometer is sensitive enough to be used in the feedback loop of a self-oscillating resonant element. In addition, the convergent beam Michelson interferometer is much less sensitive to tilt misadjustment of the mirrors 82 and 84. The Michelson interferometer based techique may be used with a wide variety of resonant structures, such as ribbons vibrating in torsion or flexure, tuning forks, double tuning forks (DTF's), cantilever beams and their sustitutes and equivalents.

To complete the self-oscillating loop the modulated output beam should be used to drive the resonant element. This may be accomplished, for example, by directing the modulated light to a metal film on the resonator, where the metal film can couple the optical power to motion of the resonator by the previously described photokinetic effect. The phase should be selected to optimize positive feedback.

The preferred embodiments have inherent rejection of common mode motions of the resonant element as a whole relative to the mounting structure and light delivery system. In the Michelson interferometeric-based technique, any independent motion of beamsplitter 80 and fixed mirror 82 relative to the resonator will result in unwanted modulation of the light. FIG. 12 shows the special prism best. The fiber optic or integrated optic version of the beamsplitter is shown best in FIG. 16, described hereinafter. The split beams terminate on the resonator at locations analogous to those of coatings at locations 82 and 84. Both locations move in push-pull fashion, doubling thereby the sensitivity and eliminating sensitivity to common mode motion of the resonator as a whole relative to the rest of the optical system. The resulting complementary modulated light beam, returned toward the source, carries the modulating frequency, and thus the resonant element operating frequency, back to the remote location.

According to the first embodiment of the present invention, a prism beamsplitter may be used to avoid the undesirable effects of ambient vibration and thermally induced dimensional change. It is shown in FIGS. 12 through 15. The special prism beamsplitter 110 used is designed such that both Michelson interferometer beams can be made parallel so that they can be reflected from two adjacent locations on a moving resonator which locations have differential motion in the desired mode of resonance. In this way light modulation is the result of the desired resonant vibration as distinct from common mode motion of the resonator with respect to the beamsplitter prism or mounting structure.

There is shown in FIG. 12 optical fiber 24, first collimator lens 76, output lens 78, resonator mounts 92, torsional ribbon resonator 108, special prism beamsplitter 110, prism entrance face 112, fist 45-degree prism roof face 114, second 45-degree prism roof face 116, and prism exit face 120. In FIG. 13 there is shown prism entrance face 112, first 45-degree prism roof face 114 and prism bottom surface 118. Shown in FIG. 14 are second 45-degree prism roof face 116, prism bottom surface 188, and prism exit face 120. FIG. 15 shows torsional ribbon resonator 108, entrance prism facd 112, first 45-degree prism roof face 114 and prism bottom surface 118.

The resonant element shown in FIGS. 12 and 15 is a torsional ribbon 108 such that, as the reflecting surface 82 (see FIG. 15) moves toward the beamsplitter prism 110, reflecting surface 84 moves away. Common mode motion of reflecting surfaces 82 and 84 together affects both arms of the interferometric arrangement equally so as not to contribute to light modulation. The desired torsional mode has a push-pull effect on the interferometer arms and results in high modulation sensitivity.

FIGS. 12 through 15 depict various projections of the novel prism beamsplitter. The light paths are somewhat complex to visualize three-dimensionally, thus FIGS. 12 through 15 show the prism beamsplitter in plan view and the front, side and rear elevation views. Incident light flux $I_0$ enters prism beamsplitter 110 through face 112 and is divided by the beamsplitter half-mirror coating 80. The transmitted portion of the light flux meets 45-degree roof face 114 and is directed downwards through the bottom surface 118 of the prism beamsplitter 110 to focus on the resonator 108 at 82. The portion of the light flux reflected by beamsplitter 80 of prism 110 strikes 45-degree roof face 116 and is similarly directed downwards through bottom surface 118 of prism 110 to focus on the resonator 108 at coating 84. The modulated output beam $I_t$ exits face 120 and can be used to drive the resonator in any of the various ways known to artisans in the field, including the methods known as photokinetic, and "opto-electric" and "electro-optic", including the step of conversion of light to electricity.

By selecting suitable angles for the prism faces 112 and 120, the input light ($I_0$) and exit light ($I_t$) paths can be made (by refraction at the air - prism interface) to lie along the axis of the resonator and so produce a very compact optically driven resonator package.

In terms of the prism beamsplitter means depicted in FIGS. 5, 6, and 12 through 15, light enters face CDH (112) and is split by the coating BDH (80) with transmitted and reflected split beams being totally internally reflected from faces ABH (114) and BCH (116) respectively before exiting portions of base ABD (118) and BCD respectively to impinge on retro-reflecting surfaces of the resonator. The resulting recombined and modulated transmitted beam exits face ADH (120) and the recombined and modulated reflected beam exits face CDH (112), back towards the source.

To advantage, surfaces 112, 118, and 120 may be antireflection coated. If surfaces 114 and 116 are not to be metalized, the prism refractive index should be sufficiently high to ensure total internal reflection.

In an alternate embodiment, a Michelson interferometer can be constructed using optical fibers and a fiber splitter so as to eliminate the need for bulk optic components. The optical fibers transporting the split beams may terminate close to reflective locations on the resonator and so sense differential motion while discriminating against common mode undesired motions.

In yet another alternative embodiment, an integrated optic splitter may be used.

Figure 16:
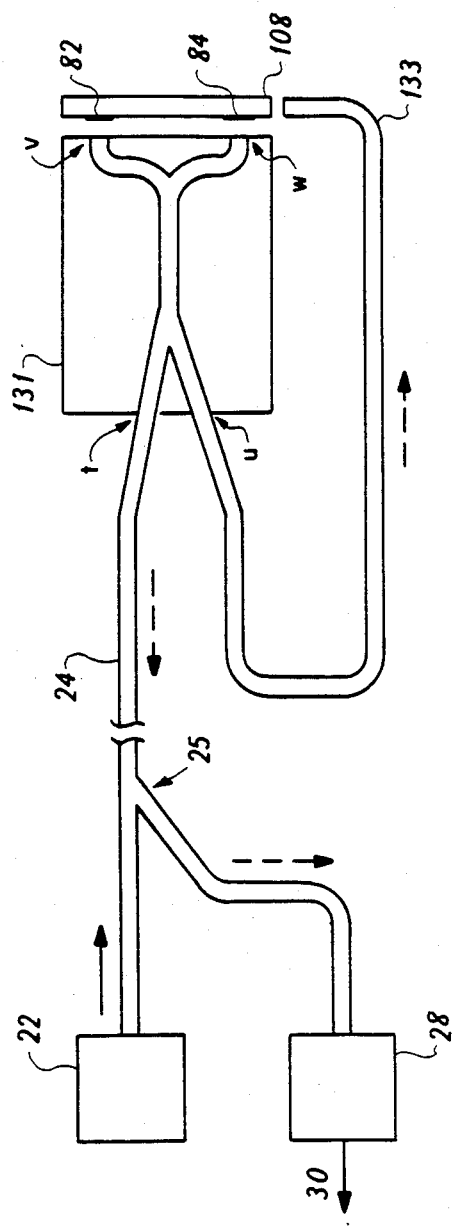
FIG. 16 shows a multiple path optical fiber form of the invention.

Referring now to FIG. 16, there is shown a simplified view of the invention utilizing light source 22, fiber optic 24 pathway, fiber splitter 25, detection means 28, signal output 30, reflective layers or mirrors 82 and 84 on the surface of resonator 108, a four port fiber optic or integrated optic coupler 131, a drive light path fiber optic 133 pathway, providing light modulated at the natural frequency of the resonator which can be used to drive the resonator.

The apparatus of FIG. 16 operates with a steady light source 22 providing a beam of steady light along fiber optic pathway 24 to four-port coupler 131 at entry port t, in which coupler the incoming light is split into two pathways internally to shine on mirrors 82 and 84 via ports v and w, respectively. The mirrors 82 and 84 are surface areas on resonator 108. Alternating torsional oscillations of the resonator 108 vary the optical path of the light 116 reflected by the mirrors (i.e., modulate the output beams according to the oscillation frequency of the resonator) back into ports v and w. The resonant frequency of resonator 108 may be varied in relation to an external value, which may be a measurand. A portion of the modulated light is returned along fiber optic 24 pathway carrying the frequency of the resonator and another portion is used to drive the resonator by positive feedback by fiber optic 133 pathway. This latter portion of the modulated light is used to drive the resonator 108 into resonant vibrations, such as by the photokinetic effect previously described, or such other methods as are known to those persons skilled in the art.

To advantage, the ports of the coupler v and w may be anti-reflection coated to increase modulation efficiency, and if reflective locations 82 and 84 are not closely adjacent to the ports v and w, some means of improving light collimation in the intervening space or of imaging the fiber ends on to the reflective locations may be employed.

The invention is not to be limited by the preferred embodiment already described. Other interferometric techniques can be employed to construct a self-oscillating optomechanical oscillating loop in the invention as claimed in the appended claims.

We claim:

1. An optical beamsplitter device for use in communicating optical power to a resonant element, comprising:
   (a) a source of optical power;
   (b) a first light beam pathway for carrying said optical power to a beamsplitter;
   (c) means for dividing said first light beam pathway and said optical power into at least second and third interferometer light beams pathways, each carrying a portion of said optical power; and
   (d) means for communciating the optical power on said at least second and third light beam pathways to adjacent locations on the resonant element such that differential motion between these resonant element locations modulates at least a portion of said optical power by interferometry to produce a modulated optical power beam signal.

2. Apparatus as in claim 1 further including means for returning a portion of said modulated power along said first light beam pathway.

3. Apparatus as in claim 1 wherein said beamspslitter is a prism beamsplitter.

4. Apparatus as in claim 1 wherein said beamsplitter includes at least one optical fiber splitter.

5. Apparatus as in claim 1 wherein said beamsplitter includes at least one integrated optic splitter.

6. Apparatus as in claim 1 further including means for directing a portion of the modulated optical power to the resonator so as to drive same into vibrative motion.

7. An optical prism beamsplitter for use in communicating optical power to a target, comprising a pyramid having a square base ABCD and apex H wherein edge DH is perpendicular to the ABCD plane further including one at least partially reflecting element lying in the BDH plane.

8. A method of making a prism beamsplitter for communicating optical power, comprising the steps of:
   preparing an optically suitable cube, having corners A, B, C, D, E, F, G and H, and having a partially reflecting element in the BDHF plane;
   removing outer material along the ABGH plane; and
   removing outer material along the BCHE plane.

* * * * *